US009957043B2

(12) United States Patent
Harrington et al.

(10) Patent No.: US 9,957,043 B2
(45) Date of Patent: May 1, 2018

(54) METHOD FOR MONITORING KITE AIR PRESSURE WHEN KITE BOARDING

(71) Applicant: Ocean Rodeo Sports Inc., Victoria (CA)

(72) Inventors: Ross Davis Harrington, Victoria (CA); Peter G. Berrang, Saanichton (CA)

(73) Assignee: Ocean Rodeo Sports Inc., Victoria, BC (CA)

(*) Notice: Subject to any disclaimer, the term of this patent is extended or adjusted under 35 U.S.C. 154(b) by 115 days.

(21) Appl. No.: 15/107,645

(22) PCT Filed: Jan. 15, 2015

(86) PCT No.: PCT/CA2015/050029
§ 371 (c)(1),
(2) Date: Jun. 23, 2016

(87) PCT Pub. No.: WO2015/113148
PCT Pub. Date: Aug. 6, 2015

(65) Prior Publication Data
US 2016/0325831 A1    Nov. 10, 2016

Related U.S. Application Data

(60) Provisional application No. 61/935,020, filed on Feb. 3, 2014, provisional application No. 61/933,981, filed on Jan. 31, 2014.

(51) Int. Cl.
*B64C 31/06* (2006.01)
*G01L 7/04* (2006.01)
*B64D 43/00* (2006.01)

(52) U.S. Cl.
CPC ............ *B64C 31/06* (2013.01); *B64D 43/00* (2013.01); *G01L 7/043* (2013.01); *B64C 2031/065* (2013.01)

(58) Field of Classification Search
CPC ... B64C 31/06; B64C 2031/065; B64D 43/00; G01L 7/043
See application file for complete search history.

(56) References Cited

U.S. PATENT DOCUMENTS 4,708,078 A    11/1987   Legaignoux et al.
7,140,576 B2   11/2006   Logosz
(Continued)

FOREIGN PATENT DOCUMENTS

CN    202529146 U    11/2012

OTHER PUBLICATIONS

International Search Report for corresponding PCT Application No. PCT/CA2015/050029 dated Mar. 26, 2015.
(Continued)

*Primary Examiner* — Valentina Xavier
(74) *Attorney, Agent, or Firm* — Davis & Bujold PLLC; Michael J. Bujold

(57) ABSTRACT

A method for monitoring air pressure in a kite when kite boarding is described. The method involves a first step of connecting an air pressure sensor to one or more bladders of the kite. The method involves a second step of positioning a visual display for the air pressure sensor where it will be visible to a user conducting a visual inspection of the kite to display a pressure reading as sensed by the pressure sensor.

17 Claims, 8 Drawing Sheets

(56) References Cited

U.S. PATENT DOCUMENTS

| | | | |
|---|---|---|---|
| 2002/0134890 A1* | 9/2002 | Berzin | B64B 1/40 244/142 |
| 2004/0182968 A1* | 9/2004 | Gentry | B63B 35/7979 244/155 A |
| 2004/0188567 A1 | 9/2004 | Logosz | |
| 2007/0252042 A1* | 11/2007 | Smith | B64D 17/343 244/149 |
| 2009/0266283 A1* | 10/2009 | Wrage | B63H 9/0685 114/102.12 |
| 2016/0297506 A1* | 10/2016 | Duckworth | B63G 8/08 |
| 2017/0174361 A1* | 6/2017 | Thielvoldt | B64D 47/04 |

OTHER PUBLICATIONS

Written Opinion for corresponding PCT Application No. PCT/CA2015/050029 dated Mar. 26, 2015.

International Preliminary Report on Patentability for corresponding PCT Application No. PCT/CA2015/050029 dated Dec. 31, 2015.

\* cited by examiner

METHOD FOR MONITORING KITE AIR PRESSURE WHEN KITE BOARDING

FIELD

The present invention relates to an apparatus for monitoring air pressure in the leading edge bladder and strut bladders of a kite during and after kite inflation.

BACKGROUND

Kite boarding, sometimes also referred to as kite surfing, is an extreme sport whereby a person uses a kite, generally having a "C" or modified "C" shape. Such shape, also termed "a leading edge inflatable kite", is created by using a hand or electrically operated pump to inflate an elastomeric bladder contained within a protective cover material forming the kite's leading edge. The kite's leading edge, which forms a rigid C-shaped 10-20 cm diameter round tube when inflated, usually has one or more orthogonally aligned abutting struts, which structure supports the fabric material forming the kite canopy.

Besides water-based kite boarding, kites are also used on land where the rider stands on a skateboard type device (with wheels) travelling on, for example, packed sand, or sitting in a device with wheels for travel over a hard surface. Recently, kites have also been deployed by snow boarders for use over snow-covered areas.

U.S. Pat. No. 4,708,078 by Legaignoux, et al. teaches the first use of a kite design that can be re-launched from the water surface, which key innovation spurred the sport of kite boarding. Modern prior art kites are attached to 4 (or 5) lines, which lines are generally 10-30 meters in length, and are also attached (tethered) to the kite rider, who is wearing a special harness, allowing the kite rider, while standing on a surfboard-like device, to be pulled along the surface of the water due to wind powering the kite.

A key aspect of kiting is achieving proper inflation of the kite's leading edge and strut bladders, which bladders are generally comprised of air-impermeable polyurethane film, about 100 microns thick, containing inflate and deflate valves. Said bladders are covered with an abrasion-resistant and tear-resistant protective cover material. During use, the kite's leading edge and strut bladders are inflated to about 5-10 psi (34-69 kPa) above ambient atmospheric pressure. Kite sizes are based on the square area of the kite's canopy, and range from 5 m2 to over 20 m2. To maintain optimum kite rigidity, the kite's leading edge and struts are generally pumped to the same pressure. Smaller kites, such as 5 m2, are pressurized to about 10 psi (69 kPa), whereas larger kites, such as 20 m2, are pressurized to about 5 psi (34 kPa). The leading edge bladder and struts can be inflated simultaneously, or separately.

U.S. Pat. No. 7,140,576 B2 to Logosz discloses a method for pumping the leading edge kite bladder and struts simultaneously, and then closing off the struts from the leading edge, which two components are connected by a rubber tube. A clamp over the rubber tube is used to open or close the air passage between the leading edge bladder and the strut bladders. Separately sealed struts and leading edge provide floatation redundancy in case of leaks in the leading edge, or in one or more of the struts.

It is estimated that more than half of kiters "under-inflate" their kites, especially beginners, and intermediate level kiters. Kites can also slowly deflate without detection due to pinhole leaks in the leading edge bladder, or struts (if not sealed off). Under-inflated kites become "floppy" and can easily invert during use, potentially tangling lines around the kite. Also, an under-inflated kite can lose its aerodynamic shape, and thus reduce the power necessary to hold the kiter above water. Over-inflated kites can cause the protective cover material (also referred to as the leading edge tube) enclosing the kite bladder to rupture. This is especially true if the kite hits the water surface with force, causing a sudden, sharp increase in air-pressure within the leading edge bladder. Also, the protective cover material can rupture if the kite is exposed to heat, induced, for example, by leaving the kite exposed to direct sunlight.

SUMMARY

According to one aspect there is provided a method for monitoring air pressure in a kite when kite boarding. The method involves a first step of connecting an air pressure sensor to one or more bladders of the kite. The method involves a second step of positioning a visual display for the air pressure sensor where it will be visible to a user conducting a visual inspection of the kite to display a pressure reading as sensed by the pressure sensor.

According to another aspect there is provided a combination of a kite for the sport of kiteboarding, a pressure sensor and a visual display. The kite has a plurality of inflatable bladders. The pressure sensor is permanently mounted to the kite in such a manner as to sense pressure in one or more of the plurality of inflatable bladders of the kite. The visual display displays a pressure reading as sensed by the pressure sensor, the visual display being positioned where it will be visible to a user when conducting a visual inspection of the kite.

It is difficult to judge changes in the pressure level of the inflated kite over time, when the kite has been sitting on land, especially if there is a slow pinhole leak in the leading edge bladder or strut bladders. The method and combination disclosed above provide a solution to that problem.

Although some kiters use a pressure gauge on their kite pump to measure the pressure during inflation, the prior art has not suggested, or published, an apparatus for measuring kite pressure using a kite-mounted sensing means. Such a kite-mounted pressure sensor is not obvious. Kiting is considered an extreme sport. Accordingly, a kite-mounted pressure sensor must be mounted on a kite in a manner to survive high impacts on land or water, water/moisture intrusion (if use in water in contemplated), coefficient of material expansion due to thermal variations, and rugged integration with the kite fabric bladder and covering materials.

There will hereinafter be described embodiments of the present invention that use a pressure gauge that is a self-contained unit with both a pressure sensor and a visual display. It will be apparent to a person skilled in the art that the function performed by the pressure sensor and the function performed by a visual display could be separated. In theory, the visual display could be worn on a kiter's wrist in a manner similar to a wrist watch. Through the use of wireless communication modules, the pressure sensor could send signals to the visual display. At the present time, the use of a simple pressure gauge is the most cost effective solution and will be used as an example for most of the embodiments.

The invention discloses a kite-mounted pressure gauge which is waterproof, visible and readable by the kiter during kite inflation, and at any time the kite is on land or floating in the water nearby the kiter.

The invention also discloses a method for monitoring the air pressure within a kite's strut bladders and/or leading edge bladder, whereby the user visually tracks the pressure readings displayed by a kite mounted pressure gauge.

Such a kite-mounted pressure gauge needs to be rugged, low cost, water-proof, and not affect the pressurized integrity of the bladders. Also, the location of the pressure gauge should not interfere with the aerodynamics of the kite's leading edge.

A further requirement is that the kite-mounted pressure gauge is easy to see and read by the kiter during kite inflation with, preferably, a radial dial readout, where the gauge is round, with an outside diameter of 10-40 mm, preferably 15-30 mm in diameter, and display a pressure range of 0 psi (0 kPa) to 15 psi (105 kPa) over ambient atmospheric pressure.

Said pressure gauge should not lose its accuracy, or precision, over a period of hours or days. Preferably, the sensor should have an accuracy of +/−0.5 psi (3.5 kPa) or less, and have a precision of +/−0.3 psi (2.1 kPa) or less.

Also, the inventive gauge should be adapted to be lightweight, preferably weighing less than 10 grams, preferably less than 7.5 grams, preferably less than 5 grams. Furthermore, the pressure gauge should also be easy to remove and exchange in case of sensor or gauge damage or failure, and to allow installation onto prior art kits as a retrofit, or to be permanently removed.

Such pressure gauges can be mechanical or electromechanical. Although small, lightweight battery-operated pressure gauges are widely available (i.e. for monitoring tire pressure), the need to monitor, and replace batteries, is problematical. Adapting mechanically-operated tire-pressure gauges to be reliable in an aggressive sport, such as kite boarding, would be difficult, as would reading such a gauge from a distance.

Those skilled in the art will understand that there are many types of commercially available pressure sensors, which sensors are incorporated into a wide variety of pressure gauges. However, to meet the specific design criteria of a kite-mounted pressure gauge, the preferred embodiment is a modified mechanical pressure gauge, which gauge contains a Bourbon tube sensing element, and which gauge housing is adapted to be water-proof, rugged and reliable. Such a gauge does not require electrical power, and can be further modified to provide an easy to read radial dial readout of the kite's pressure. Also, such a gauge can be made lightweight, robust and low profile at relatively low cost. With respect to mounting a pressure gauge on a kite, there exist various options, as described below.

In the preferred embodiment, the pressure gauge is mounted in-line of the tube connecting the kite's leading edge and a strut. This location does not interfere with the aerodynamics of the kite's leading edge. Also, this location allows a direct pressure measurement of the air contained within the leading edge and strut bladders. From a reliability perspective, it is preferred to minimize the number of orifices penetrating the kite's leading edge bladder, as more orifices increase the chance of leaks at the orifice seals.

In an alternate embodiment, the pressure gauge in-line with the rubber tube can be adapted to serve the dual purpose of measuring both kite bladder pressure and also act as a valve to seal the air passage between the leading edge and a strut. Such valve function can be accomplished by twisting/turning the gauge, preferably clockwise, which action acts to close a valve and thus the flow of air, between the leading edge and strut bladders.

In another aspect of the invention, the pressure gauge is mounted in-line with the rubber tube connecting the kite's leading edge and a strut, where such rubber tube also contains a clamp, which clamp can be pinched to close off the air passage between the kite's leading edge and a strut.

In a further aspect of the invention, the pressure gauge is mounted in-line with the rubber tube connecting the kite's leading edge and a strut, where such rubber tube contains a one-way valve, which valve allows air to flow from the kite's leading edge to a strut, but prevents the air flowing in the opposite direction. A deflate valve on the strut allows for deflation of the strut.

In an alternate embodiment, the pressure gauge can be mounted directly on the kite's leading edge tube. This location would have minimal impact on the aerodynamics of the kite's leading edge, as such location can be on the backside of the kite's leading edge. One disadvantage of such location is the added risk of leaks in the kite's leading edge due to an additional orifice in the kite's leading edge bladder. An advantage to such location is simplicity, and easy visual readout by the kiter during inflation. However, such location does not allow for retrofit of prior art kites.

In a further alternate embodiment, the pressure gauge can be mounted directly on a kite strut tube. This location would have minimal impact on the aerodynamics of the kite's leading edge, as such location is on the backside of the kite's leading edge. Although one potential disadvantage of such location is the added risk of leaks in the strut due to an additional orifice in the strut bladder, such strut can be isolated by pinching or clamping the rubber tube connecting the strut bladder to the kite's leading edge bladder. An advantage to such location is simplicity, and easy visual readout by the kiter during inflation. However, such location does not allow for retrofit of prior art kites.

The indirect measurement of pressure in the kite's leading edge has the advantage of not directly connecting the air chamber formed by the kite's leading edge bladder and/or strut bladder, thereby minimizing the possibility of leaks. However, an indirect measurement is more complicated, and cannot be easily retrofitted to existing kites.

In yet another alternate embodiment, a pressure gauge is attached to a non-elastomeric, airtight, sealed bag, which bag is partially inflated by air, or held partially inflated with a polymer foam material therein. Such a sealed bag is inserted in the space between the kite's leading edge bladder and protective covering material (the leading edge tube). For convenience, a pocket can be sewn into the protective covering material, to allow the insertion and removal of the sealed bag. As the kite's leading edge bladder is inflated, the bladder's expansion, and pressure against the sealed bag, will cause the air in the sealed bag to compress, which compression is measured by the pressure gauge attached to the bag.

The indirect measurement of pressure in the kite's strut bladder has the advantage of not directly connecting the gauge to the kite's leading edge bladder, thereby minimizing the possibility of leaks in the leading edge bladder. However, an indirect measurement is more complicated, and cannot be easily retrofitted to existing kites.

In a final alternate embodiment, a pressure gauge is attached to a non-elastomeric, airtight, sealed bag, which bag is partially inflated by air, or held partially inflated with a polymer foam material therein. Such a sealed bag is inserted in the space between the protective covering material covering the strut and the strut's bladder. For convenience, a pocket can be sewn into the protective covering material, to allow the insertion and removal of the sealed bag. As the kite's strut (and leading edge bladder) are inflated, the strut's bladder expansion, and pressure against the sealed bag, will cause the air in the sealed bag to compress, which compression is measured by the pressure gauge attached to the bag. The air passage between the strut bladder and the leading edge bladder, which are connected by a rubber tube, can then be closed using a pinch clamp, or a one-way valve.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
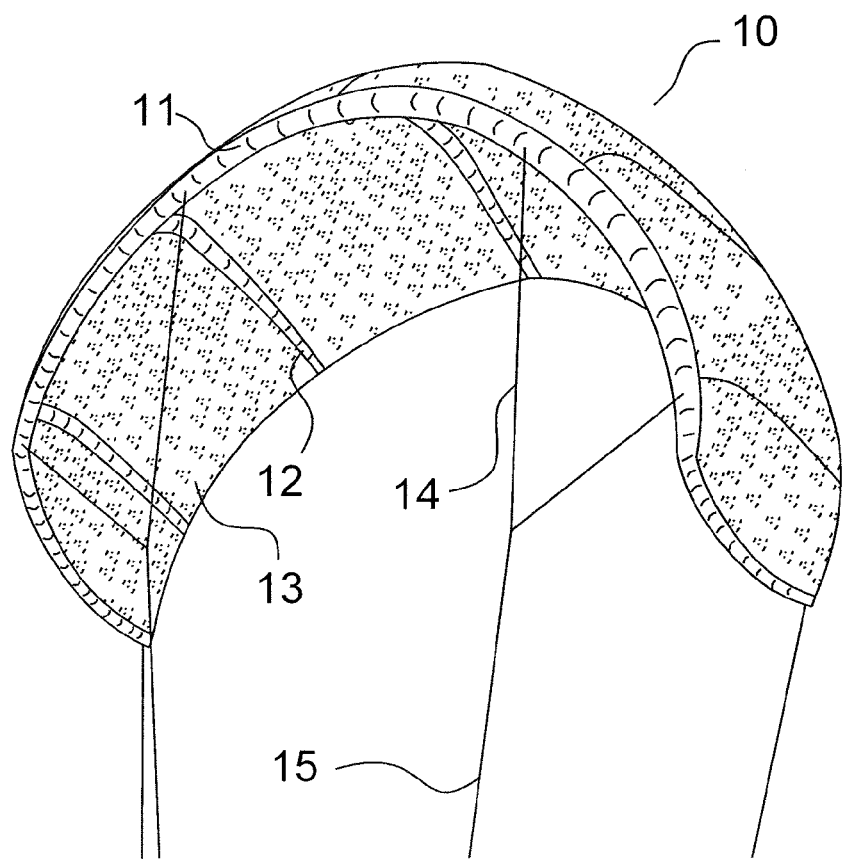
FIG. 1—Perspective view of an inflated kite

FIG. 1 illustrates an inflated kite 10, showing leading edge tube 11, strut 12 and canopy 13. Bridle 14 connects to the kite's leading edge tube 11, with kite line 15 connecting to kite 10 at the distal end and to the kiter (not shown) at the proximal end.

Figure 2:
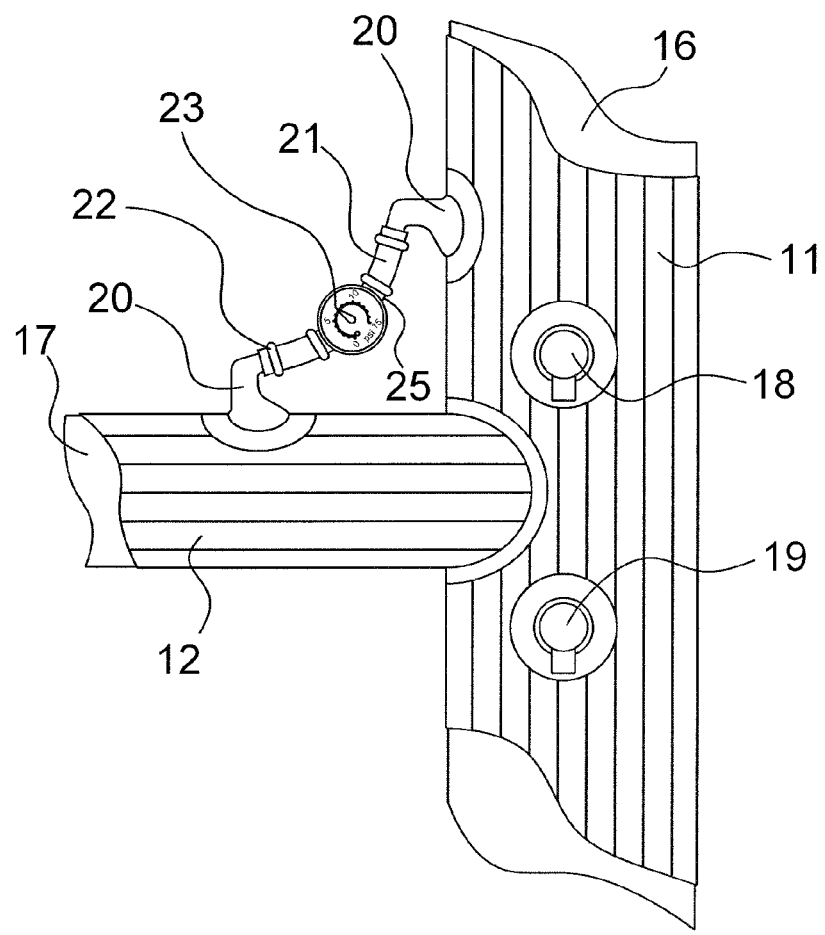
FIG. 2—Flat view of a leading edge tube and strut with a pressure gauge mounted on the connecting tube FIG. 3—Flat view of a leading edge tube and strut with a pressure gauge/shut-off valve on the connecting tube FIG. 4—Flat view of a leading edge tube and strut with a pressure gauge and a separate mechanical clamp on the connecting tube FIG. 5—Flat view of a leading edge tube and strut with a pressure gauge and a one-way valve on the connecting tube FIG. 6—Flat view of a leading edge tube and strut with a pressure gauge mounted on the leading edge tube bladder, and a mechanical clamp mounted on the connecting tube FIG. 7—Flat view of a leading edge tube and strut with a pressure gauge mounted on the strut bladder FIG. 8—Sectional view of a pressure gauge attached to a sealed bag, and mounted in a pocket between the leading edge tube and leading edge bladder.

FIG. 2 shows a flat view of leading edge tube 11 and strut 12, with pressure gauge 23 mounted in-line on connecting tube 21. Pressure gauge 23 has two aspects a pressure sensor and a visual display, that displays pressure readings as sensed by the pressure sensor. Pressure gauge 23 contains, preferably, a Bourbon type pressure sensor, with a radial display showing pressure, which sensor is contained in a gauge that has been adapted to be watertight, rugged and lightweight. Strut bladder 17 and leading edge tube bladder 16 are not connected via a contiguous air-connection. However, valve 20 on strut 12 connects to valve 20 on leading edge tube 11 via connecting tube 21, with air flow also passing through said connections through pressure gauge 23. Air pressure gauge 23 connects to connecting tube 21 via tube fitting mount 25. Lock strap 22 acts to hold valve 20 to connecting tube 21. Air inflate valve 18 and deflate valve 19 are illustrated on leading edge tube 11. As leading edge tube 11 is inflated, gauge 23 will register, and display, the air pressure within leading edge tube bladder 16 and strut bladder 17. Such display of air pressure, during inflation, is visually observable by the kiter, allowing the kiter to pump the kite to the optimal recommended pressure. In one aspect, it is advantageous to create an airtight seal between each of the strut bladders, and the leading edge tube bladder, as an air leak in any strut would cause the leading edge tube to deflate, which scenario could strand the kiter in the water, far from shore.

Figure 3:
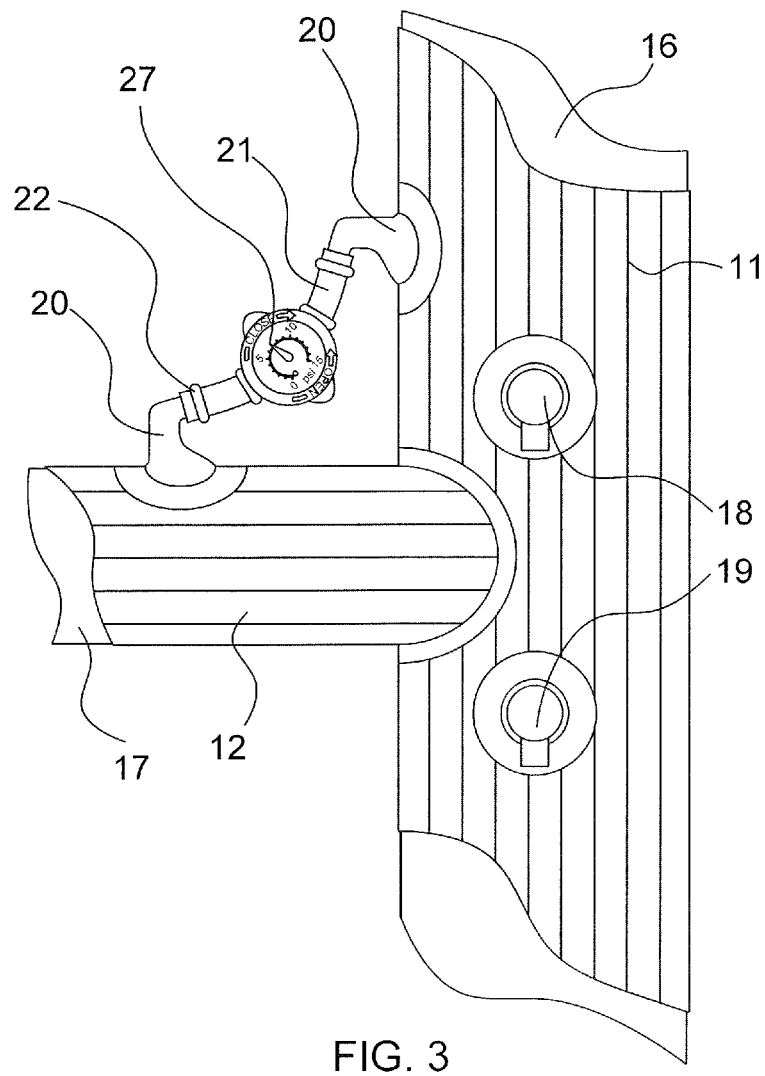

Accordingly, in one embodiment, shown in FIG. 3, the pressure gauge is adapted to include an integral shut-off valve 27, allowing the user to simply turn said valve 27, to block the air passage between strut bladder 17 and leading edge tube bladder 16.

Figure 4:
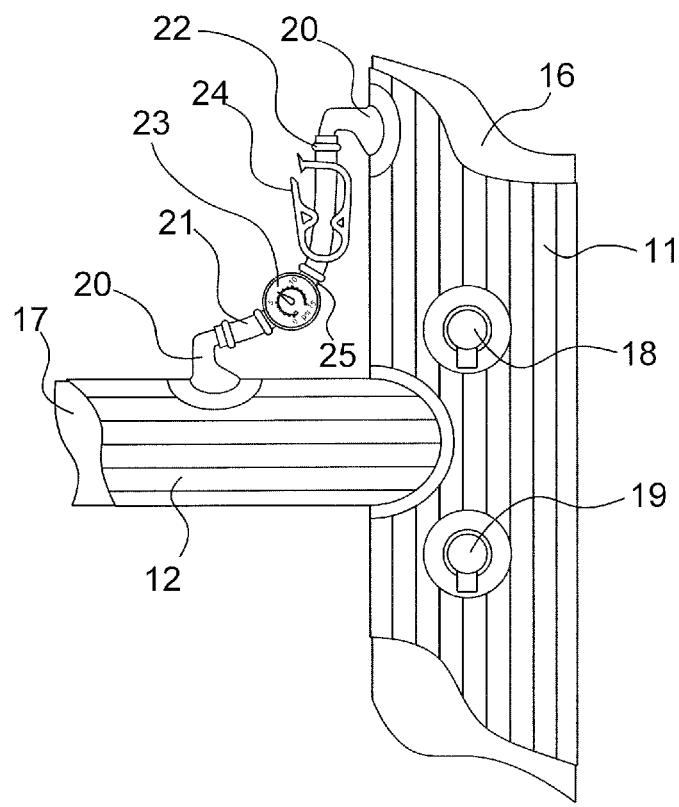

FIG. 4 shows a flat view of leading edge tube 11 and strut 12, with pressure gauge 23 and a separate mechanical clamp 24 on connecting tube 21. This embodiment is similar to that described for FIG. 3, but rather than using an integral shut-off valve on the pressure gauge, this embodiment allows the user to squeeze pinch clamp 24 to block the air passage between strut bladder 17 and leading edge tube bladder 16. One added advantage of isolating the strut and leading edge bladders after inflation is that, if the leading edge is accidentally deflated, the strut will still provide some floatation to prevent the kite from sinking.

Figure 5:
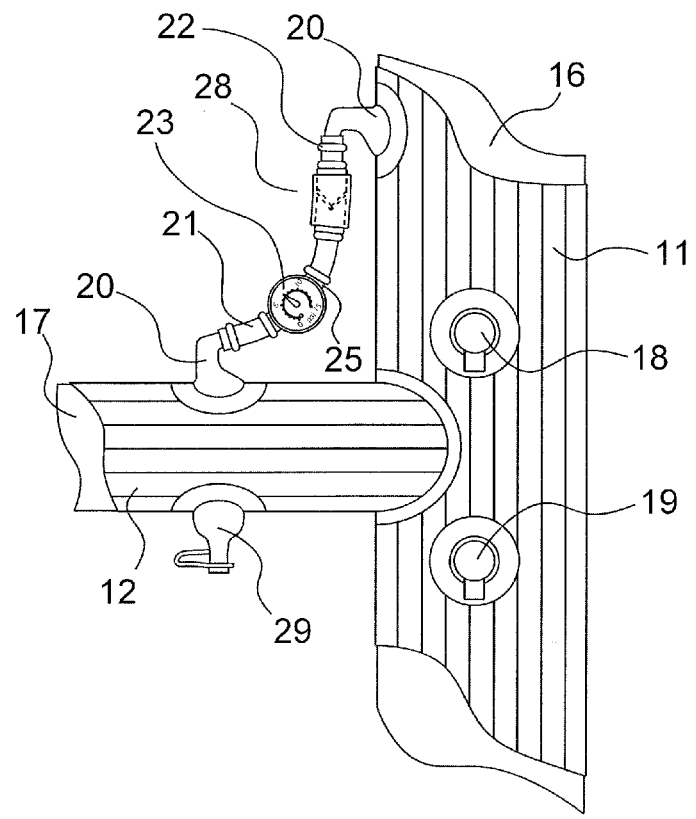

In a further embodiment, shown in FIG. 5, a one-way valve 28 is used to only allow air flow in one direction, namely from leading edge bladder 16 into strut bladder 17, but not in the other direction. This embodiment isolates leading edge bladder 16 in the event that there is a leak in strut bladder 17. To release the pressure in bladder 17 after kite use, deflate valve 29 can be opened.

Figure 6:
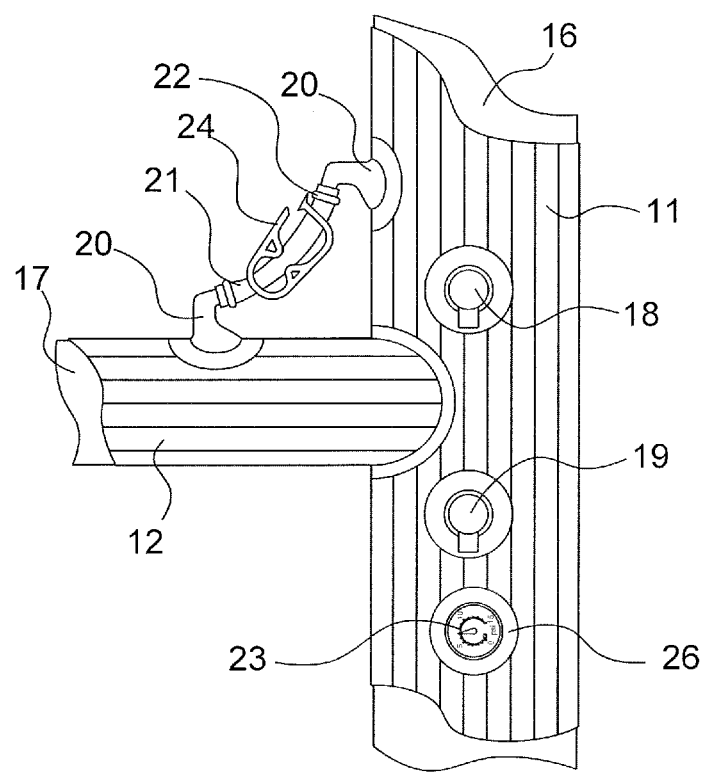

In another embodiment, shown in FIG. 6, pressure gauge 23 can be mounted directly onto leading edge tube 11. In this embodiment gauge 23 connects directly to leading edge bladder 16, where gauge 23 is mounted in valve base 26, which base is attached to leading edge tube 11. This embodiment, though feasible, adds another orifice onto leading edge bladder 16, creating a potential for leakage.

Figure 7:
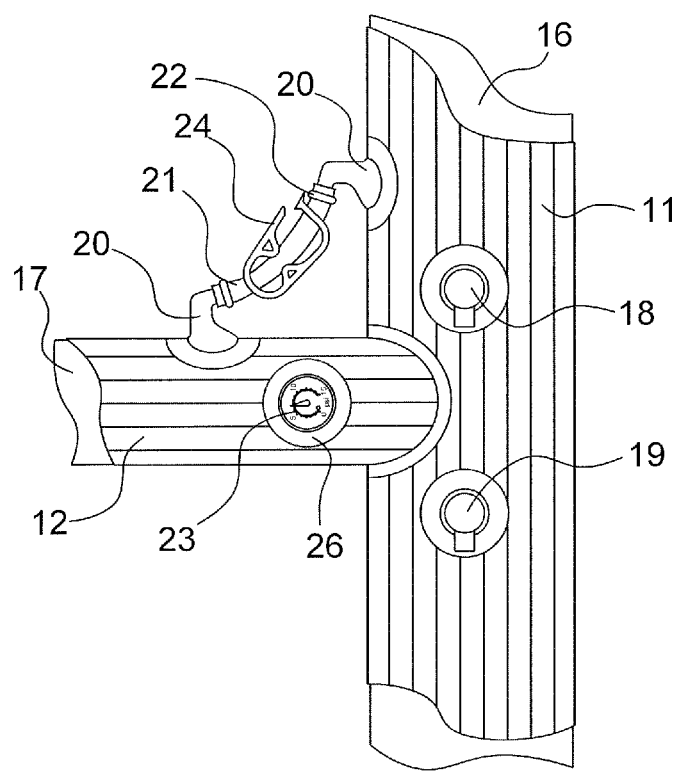

In yet another embodiment, shown in FIG. 7, pressure gauge 23 can be mounted on strut 12, where the air passage between strut bladder 17 and leading edge bladder 16 can be isolated by simply pinching tube clamp 24.

Figure 8:
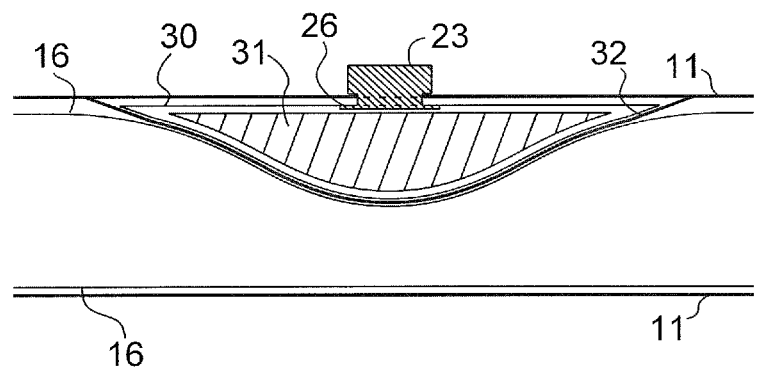

In an alternate embodiment, the kite's bladder pressure can also be measured indirectly, without creating an orifice into the leading edge bladder, or strut bladder. Such measurement, depicted in FIG. 8, has the advantage of not directly connecting the air chamber formed by the kite's leading edge bladder and/or strut bladder, thereby minimizing the possibility of leaks. However, an indirect measurement is more complicated, and cannot be easily retrofitted to existing kites. In this embodiment, pressure gauge 23 is attached to non-elastomeric, airtight, sealed bag 30, which bag 30 is partially inflated by air, or held partially open with polymer foam 31 within bag 30. Such a sealed bag 30 is inserted into the space between the kite's leading edge bladder 16 and protective covering material 11. For convenience, a pocket can be sewn into the protective covering material 11, to allow the insertion and removal of sealed bag 30. As the kite's leading edge bladder 16 is inflated, the bladder's expansion, and pressure against sealed bag 30, causes the air in sealed bag 30 to compress, which compression is measured by pressure gauge 23 attached to bag 30 via valve base mount 26.

Figure 9:
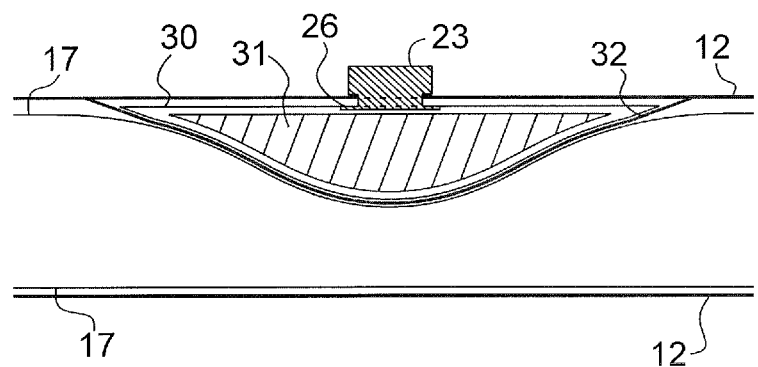
FIG. 9—Sectional view of a pressure gauge attached to a sealed bag, and mounted in a pocket between the strut and strut bladder.

In a final embodiment, shown in FIG. 9, the indirect measurement of pressure in the kite's strut bladder can be accomplished by mounting pressure gauge 23 to non-elastomeric, airtight, sealed bag 30, which bag 30 is partially inflated by air, or held partially open with polymer foam 31 within bag 30. Such a sealed bag 30 is inserted into the space between the kite's strut bladder 17 and protective material covering strut 12. This embodiment is analogous to the arrangement shown in FIG. 8, but with gauge 23 mounted on strut 12, rather than on leading edge tube 11.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A method for monitoring air pressure in a kite when kite boarding; comprising:
   positioning an airtight non-elastomeric bag in a confined space adjacent to a bladder of the kite, such that inflation of the bladder impinges upon the space placing the bag under the same pressure as the bladder;
   connecting a pressure sensor to the bag, to sense air pressure within the bag, thereby indirectly measuring pressure in the bladder without requiring an air connection between the pressure sensor and the bladder; and
   positioning a visual display for the air pressure sensor where it will be visible to a user of the kite to display a pressure reading as sensed by the pressure sensor.

2. In combination:
   a kite for the sport of kiteboarding, the kite having a plurality of inflatable bladders;
   an airtight non-elastomeric bag in a confined space adjacent to a selected one of the inflatable bladders of the kite, such that inflation of the selected bladder impinges upon the space placing the bag under the same pressure as the selected bladder;
   a pressure sensor connected to the bag, to sense air pressure within the bag, thereby indirectly measuring pressure in the selected bladder without requiring an air connection between the pressure sensor and the selected bladder; and
   a visual display which displays a pressure reading as sensed by the pressure sensor, the visual display being visible to a user of the kite.

3. The combination of claim 2, wherein the visual display is waterproof.

4. The combination of claim 2, wherein the pressure sensor and visual display are impact resistant.

5. The combination of claim 2, wherein said pressure sensor is a Bourdon tube pressure sensor element.

6. The combination of claim 2, wherein said visual display is round and has a radial display readout.

7. The combination of claim 2, wherein said visual display has a digital readout.

8. The combination of claim 2, wherein the outside diameter of said visual display is 10-40 mm.

9. The combination of claim 8, wherein the outside diameter of said visual display is 15-30 mm.

10. The combination of claim 2, wherein the pressure sensor has an accuracy of +/−0.5 psi (3.5 kPa) or less.

11. The combination of claim 2, wherein said pressure sensor has an accuracy of +/−0.3 psi (2.1 kPa) or less.

12. The combination of claim 2, wherein said pressure sensor has a range of 0 psi (0 kPa) to 15 psi (105 kPa) over ambient atmospheric pressure.

13. The combination of claim 2, wherein a combined weight of the pressure sensor and the visual display is 10 grams or less.

14. In combination:
   a kite for the sport of kiteboarding, the kite having at least one inflatable bladder and struts;
   a pressure gauge sealed in an orifice between the at least one inflatable bladder and one of the struts, the orifice being dedicated solely to receiving the pressure gauge, the pressure gauge having a visual display which displays to a user of the kite a pressure reading as sensed by the pressure gauge, the pressure gauge and the visual display being powered solely by a differential in air pressure between bladder air pressure and ambient air pressure.

15. The combination of claim 14, where said pressure gauge has an associated valve to shut off air flow through the pressure gauge.

16. The combination of claim 2, wherein the space is between a leading edge bladder and a protective cover for the leading edge bladder.

17. The combination of claim 2, wherein the space is between a strut bladder and a protective cover for the strut bladder.

* * * * *